United States Patent Office 2,845,354
Patented July 29, 1958

2,845,354

METHOD FOR PREVENTING COAGULATION OF TABLE SALT AND THE RESULTING PRODUCT

Tetsuo Ogawa, Tokyo, Seiichi Maeda, Kawasaki-shi, and Junko Osawa, Tokyo, Japan

No Drawing. Application June 28, 1955
Serial No. 518,658

Claims priority, application Japan December 29, 1954

8 Claims. (Cl. 99—143)

This invention is concerned with a method for preventing the coagulation of table salt by moisture.

The purpose of the invention is to improve greatly the taste of table salt, and simultaneously to prevent it from hardening by moisture due to the humidity in the air.

The hardening of dry table salt is also caused by the change of humidity in the air coming in contact with the salt. The moisture absorption generally occurs through contact with air, which has a humidity beyond the critical point for a considerable time.

If common salt comes in contact with substances which are soluble and are capable of making a higher total concentration than the mere common salt in its saturated solution, the critical humidity is considerably lowered as compared to the common salt alone and causes it to become more hygroscopic.

Glutamic acid in its pure form is substantially insoluble in water or a solution of salt. Therefore, if fine crystals of glutamic acid lie between salt crystals, or if the salt crystals themselves are coated with fine crystals of glutamic acid, the salt can be prevented from hardening by moisture, to an almost perfect degree.

Foodstuffs are usually weakly acid or neutral, so therefore, when the salt containing glutamic acid is used for food, the glutamic acid immediately dissolves, making no change in the pH of the food due to the buffer action, but the flavor of the salt is considerably improved by multiplication of the characteristic flavor of glutamate.

Further improvement in flavor can be effected by mixing the common salt with monosodium glutamate and furthermore by adding a quantity of glutamic acid as indicated below in Example 2.

Glutamic acid which is a component effective in preventing the absorption of humidity must be free acid. The use of sodium salts of glutamic acid will eventually increase the hydroscopicity. The advantageous results of glutamic acid mixed with common salt are illustrated as follows:

A sample of 20 g. common salt mixed with L-glutamic acid of one percent in relation thereto, a sample of 20 g. common salt mixed with monosodium glutamate equivalent to said amount of glutamic acid, and unmixed common salt were allowed to stand at the average room temperature of 15° C. and relative humidity of 60–80%. The solidifying condition of these three samples was carefully observed by shaking sample containers lightly once a day.

| Time elapsed (day or days) | Solidifying Condition | | |
|---|---|---|---|
| | Common salt mixed with L-glutamic acid | Common salt mixed with monosodium glutamate | Common salt |
| 1 | Unchanged | Unchanged | Appears to be wet. |
| 2 | do | do | Begins to solidify. |
| 3 | do | do | Solidified. |
| 4 | do | do | Solidified crystal sticks to the wall of container. |
| 5 | do | do | Solidification increased. |
| 6 | do | do | Do. |
| 7 | do | do | Do. |
| 8 | do | Begins to solidify | Wholly solidified. |
| 9 | do | Solidified into crystals. | Do. |
| 10 | do | do | Do. |

The following examples will further illustrate the invention:

*Example 1*

First, grind 2 g. of glutamic acid in a ball mill, and add 2–3% water, mix with 100 g. of common salt, and rapidly dry the mixture. 102 g. of table salt is obtained.

*Example 2*

Spray a vapor of 3–4% onto 7 g. of monosodium glutamate, then add 3 g. of ground glutamic acid, dry rapidly and afterwards add 90 g. of common salt thereby forming a balanced mixture. As a result 100 g. of flavored salt is obtained.

The product manufactured as shown in Examples 1 and 2 and common table salt alone were given a hygroscopic test for 10 days under the same conditions, viz, means temperature 18° C.: mean humidity 85%. The result showed that the common salt became hard whereas the product in accordance with the invention did not. Therefore, the superiority of the invented product produced in accordance with the invention was clearly proved.

What is claimed is:

1. A method for preventing coagulation of table salt by moisture comprising coating crystals of table salt with 2 to 10% by weight glutamic acid.

2. A method for preventing coagulation of table salt by moisture comprising intimately mixing crystals of table salt with 2 to 10% by weight fine glutamic acid.

3. A method for preventing coagulation of table salt by moisture comprising coating crystals of table salt with at least 1% by weight glutamic acid.

4. A method for preventing coagulation of table salt by moisture comprising intimately mixing crystals of table salt with at least 1% by weight fine glutamic acid.

5. Crystals of table salt having mixed therewith 2 to 10% by weight glutamic acid.

6. Crystals of table salt coated with 2 to 10% by weight glutamic acid.

7. Crystals of table salt having at least 1% by weight glutamic acid intimately mixed therewith.

8. Crystals of table salt coated with at least 1% by weight glutamic acid.

References Cited in the file of this patent

UNITED STATES PATENTS

| 1,874,055 | Liebrecht | Aug. 30, 1932 |
| 2,046,862 | Allen | July 7, 1936 |
| 2,500,919 | Cahn | Mar. 21, 1950 |
| 2,596,333 | Halpern et al. | May 13, 1952 |